(12) United States Patent
Jang et al.

(10) Patent No.: US 10,810,881 B2
(45) Date of Patent: *Oct. 20, 2020

(54) METHOD OF PROVIDING SOUND TRACKING INFORMATION, SOUND TRACKING APPARATUS FOR VEHICLES, AND VEHICLE HAVING THE SAME

(71) Applicant: HYUNDAI MOTOR COMPANY, Seoul (KR)

(72) Inventors: Yoon Ho Jang, Suwon-si (KR); Jae Kwang Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 807 days.

This patent is subject to a terminal disclaimer.

(21) Appl. No.: 15/387,424

(22) Filed: Dec. 21, 2016

(65) Prior Publication Data

US 2018/0114445 A1   Apr. 26, 2018

(30) Foreign Application Priority Data

Oct. 26, 2016   (KR) .......................... 10-2016-0140160

(51) Int. Cl.
   *G08G 1/16*   (2006.01)
   *G01S 3/801*   (2006.01)
   (Continued)

(52) U.S. Cl.
   CPC ............. *G08G 1/167* (2013.01); *B60Q 9/008* (2013.01); *B60R 1/00* (2013.01); *G01S 3/801* (2013.01);
   (Continued)

(58) Field of Classification Search
   CPC . G08G 1/16; G08G 1/167; B60Q 9/00; B60Q 9/008; B60R 1/00; B60R 2300/301;
   (Continued)

(56) References Cited

U.S. PATENT DOCUMENTS 9,733,346 B1 *  8/2017  Jang .......................... B60Q 9/00
2008/0083282 A1 *  4/2008  Okuda ................. B60Q 1/0023
                                                               73/627

(Continued)

FOREIGN PATENT DOCUMENTS

JP          6-344839 A    12/1994
JP       2005-115813 A     4/2005
(Continued)

OTHER PUBLICATIONS

Notice of Allowance of corresponding Korean Patent Application No. 10-2016-0140160—5 pages (dated Jun. 5, 2018).

(Continued)

*Primary Examiner* — Hovhannes Baghdasaryan
*Assistant Examiner* — Amie M Ndure
(74) *Attorney, Agent, or Firm* — Mintz Levin Cohn Ferris Glovsky and Popeo, P.C.; Peter F. Corless

(57) ABSTRACT

Disclosed are a method of providing sound tracking information, a sound tracking apparatus for vehicles and a vehicle having the sound tracking apparatus. The method of providing sound tracking information includes generating sound tracking results based on sound data generated by sensing sound generated around a vehicle, calculating 3D coordinates of a target sound source according to angle values of the target sound source recognized from the sound tracking results, and generating a notification of the target sound source based on the 3D coordinates, and the sound tracking results include information on probabilities that an object corresponding to the target sound source is present at respective angles in each of continuous frames according to time.

17 Claims, 8 Drawing Sheets

(51) Int. Cl.
*G01S 5/20* (2006.01)
*B60Q 9/00* (2006.01)
*B60R 1/00* (2006.01)
*H04R 1/40* (2006.01)
*G01S 3/80* (2006.01)

(52) U.S. Cl.
CPC ............. *G01S 5/20* (2013.01); *H04R 1/406* (2013.01); *B60R 2300/301* (2013.01); *B60R 2300/802* (2013.01); *G01S 3/8006* (2013.01); *H04R 2430/21* (2013.01)

(58) Field of Classification Search
CPC ....... B60R 2300/802; G01S 3/80; G01S 5/20; G01S 3/801; G01S 3/8006; H04R 1/40; H04R 1/406; H04R 2430/21
See application file for complete search history.

(56) References Cited

U.S. PATENT DOCUMENTS

| | | |
|---|---|---|
| 2009/0322559 A1 | 12/2009 | Yen et al. |
| 2010/0191433 A1* | 7/2010 | Groult .................. G01S 15/931 701/70 |
| 2010/0228482 A1 | 9/2010 | Yonak |
| 2015/0304784 A1 | 10/2015 | Snider et al. |
| 2016/0003943 A1 | 1/2016 | Nakano et al. |
| 2018/0343534 A1* | 11/2018 | Norris .................. H04N 7/147 |

FOREIGN PATENT DOCUMENTS

| | | |
|---|---|---|
| JP | 2007-122201 A | 5/2007 |
| JP | 2010-236939 A | 10/2010 |
| JP | 2011-34436 A | 2/2011 |
| KR | 10-2011-0086210 A | 7/2011 |
| KR | 10-1645135 B1 | 8/2016 |
| KR | 10-1687296 B1 | 12/2016 |

OTHER PUBLICATIONS

Office Action dated Jan. 17, 2018 in corresponding Korean Patent Application No. 10-2016-0140160—5 pages.

* cited by examiner

METHOD OF PROVIDING SOUND TRACKING INFORMATION, SOUND TRACKING APPARATUS FOR VEHICLES, AND VEHICLE HAVING THE SAME

CROSS REFERENCE TO RELATED APPLICATION

This application claims the benefit of Korean Patent Application No. 10-2016-0140160, filed on Oct. 26, 2016, which is hereby incorporated by reference as if fully set forth herein.

BACKGROUND

Field

The present disclosure relates to a method of providing sound tracking information, a sound tracking apparatus for vehicles and a vehicle having the same, and more particularly, to a method of providing sound tracking information in which a counterpart vehicle driving around a vehicle may be accurately recognized, a sound tracking apparatus for vehicles and a vehicle having the same.

Discussion of the Related Art

Various noises are generated around a vehicle during driving. However, an elderly driver having loss of auditory ability or a driver having a poor sense of auditory direction may insensitively respond to a specific noise to which the driver should attend (for example, a vehicle horn sound, a siren sound, etc.) Further, due to development of vehicle sound insulation technology, it may be difficult even for drivers having a keen sense of hearing to accurately hear sound generated from the outside of vehicles. Moreover, if a driver recognizing specific sound generated from a rear area looks back, safe driving may be threatened.

The disclosure of this section is to provide background of the invention. Applicant notes that this section may contain information available before this application. However, by providing this section, Applicant does not admit that any information contained in this section constitutes prior art.

SUMMARY

The present disclosure is directed to a method of providing sound tracking information, a sound tracking apparatus for vehicles and a vehicle having the same that substantially obviates one or more problems due to limitations and disadvantages of the related art.

It is beneficial to inform a driver of information on specific sound, such as which sound is generated around a vehicle during driving, in which direction such sound is generated, etc., without disturbance in safe driving. However, if a notification regarding information, to which the driver does not attend, occurs, such a notification may disturb safe driving and, thus, technology which may prevent unnecessary notifications is required.

An aspect of the present invention provides a method of providing sound tracking information in which accurate information on a counterpart vehicle driving around a vehicle may be provided, a sound tracking apparatus for vehicles and a vehicle having the same.

Additional advantages and features of the invention will be set forth in part in the description which follows and in part will become apparent to those having ordinary skill in the art upon examination of the following or may be learned from practice of the invention. Some other advantages of the invention may be realized and attained by the structure particularly pointed out in the written description and claims hereof as well as the appended drawings.

To achieve advantages and features in accordance with embodiments of the invention, as embodied and broadly described herein, a method of providing sound tracking information includes generating sound tracking results based on sound data generated by sensing sound generated around a vehicle, calculating 3D coordinates of a target sound source according to angle values of the target sound source recognized from the sound tracking results, and generating a notification of the target sound source based on the 3D coordinates, wherein the sound tracking results include information on probabilities that an object corresponding to the target sound source is present at respective angles in each of continuous frames according to time.

In another aspect of the present invention, a sound tracking apparatus for vehicles includes a sound tracker configured to generate sound tracking results based on sound data generated by sensing sound generated around a vehicle, a 3D information generator configured to calculate 3D coordinates of a target sound source according to angle values of the target sound source recognized from the sound tracking results, and a notification generator configures to generate a notification of the target sound source based on the 3D coordinates, wherein the sound tracking results include information on probabilities that an object corresponding to the target sound source is present at respective angles in each of continuous frames according to time.

In yet another aspect of the present invention, a vehicle includes first to third microphones configured to generate sound data by sensing sound generated around the vehicle, a sound tracking apparatus configured to calculate 3D coordinates of a target sound source according to angle values of the target sound source recognized from sound tracking results generated based on the sound data, and to generate a notification of the target sound source based on the 3D coordinates, and a notification output unit configured to inform a driver of information on the target sound source, wherein the sound tracking results include information on probabilities that an object corresponding to the target sound source is present at respective angles in each of continuous frames according to time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiment(s) of the invention and together with the description serve to explain the features of the invention. In the drawings.

DETAILED DESCRIPTION OF THE INVENTION

Figure 1:
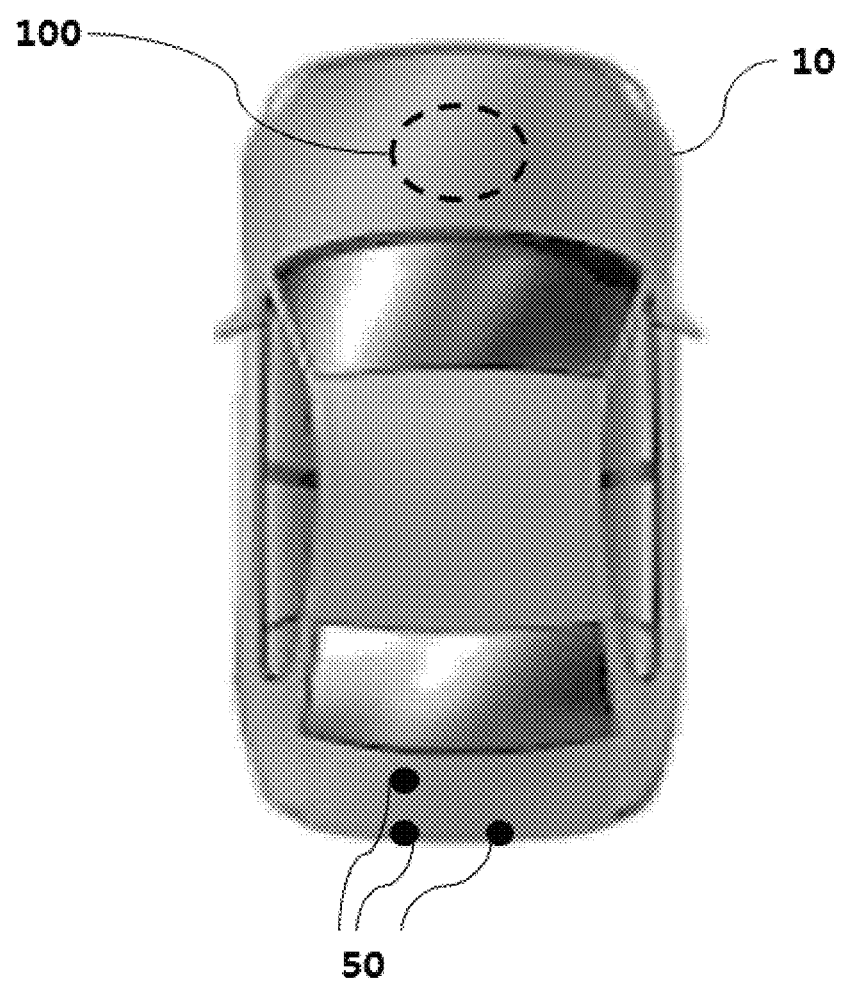
FIG. 1 is a view illustrating a vehicle in accordance with one embodiment of the present invention.

Reference will now be made in detail to embodiments of the present invention, examples of which are illustrated in the accompanying drawings. In the drawings, the same or similar elements are denoted by the same reference numerals even though they are depicted in different drawings. The suffixes "module" and "unit" used in the description below are given or used together only in consideration of ease in preparation of the specification and do not have distinctive meanings or functions.

A vehicle includes a microphone array 50 installed in a rear portion of the vehicle 10. The microphone array 50 includes two or more microphones each configured to detect sounds from behind the vehicle. A computerized controller or computing device 100 receives signals from the microphone array 50 and analyzes the sound signals to detect another vehicle (nearby or following the subject vehicle) or a sound generating object behind the subject vehicle 100. In embodiments, the controller is connected to a display or a speaker installed in the vehicle, and causes the display or the speaker to provide a warning of the detected other vehicle or sound generating object in response to a sound detected via signals from the microphone array 50.

In embodiments, based on the analysis of the signals the microphone array, the controller determines a type or class (category) of the sounds among a first predetermined set of types or classes. In embodiments, the type or class of the sounds is determined using a confidence level computed from analysis of the sounds (S30). In embodiments, based on the identified type or class, the controller determines whether a display or speaker in the vehicle cabin provides a warning of the detected sound to the driver. In embodiments, the warning includes a sound reproduced from the detected sound with adjusted volume to warn the driver.

In embodiments, based on the analysis of the signals from the microphone array, the controller determines a direction from the multi-channel microphone array (or a point of the vehicle) to the nearby vehicle in a bird's eye view. In embodiments, the controller determines a location of the other vehicle relative to the subject vehicle using the determined direction and further using at least one predetermined lane width (x1 in FIG. 6) of the current road in which the subject vehicle and/or the other vehicle is located. In embodiments, the controller is connected to a local database of the vehicle or a remote data base (via wireless communication) in which lane width information is stored in connection with identifiers of roads. Using current location (GPS coordinate available to the controller) of the subject vehicle, the controller can retrieve lane width of the current road.

In embodiments, the controller causes a display of the vehicle to show a visual alarm of the sound detected from the other vehicle. In embodiments, the display provides a rear view (or a bird's eye view) using images (video frames) captured from a rear view camera of the vehicle and overlays a visual icon 810 over a representation of the other vehicle in the rear view (or bird's eye view). In embodiments, when in response to an external sound detected, the controller causes the display switch to the rear view (or bird's eye view) from another view (navigation map, music play, etc.) or turn-on the display to display the rear view (or bird's eye view). In embodiments, the controller determines location of the visual icon 810 in the display using the location of the other vehicle relative to the subject vehicle.

FIG. 1 is a view illustrating a vehicle in accordance with one embodiment of the present invention.

With reference to FIG. 1, a vehicle 10 may generate information on specific noise, such as which noise is generated around the vehicle 10 during driving of the vehicle 10 by manipulation of a driver, in which direction such sound is generated, etc., and inform the driver of such information.

The vehicle 10 may include a multi-channel microphone system 50 which may collect external sound, and a sound tracking apparatus 100 which may generate information on specific sound based on sound information collected by the multi-channel microphone system 50. Each of respective microphones of the multi-channel microphone system 50 may be understood as a single channel microphone.

The multi-channel microphone system 50 may include three microphones and thereamong, two microphones may be disposed at both sides of the vehicle 10 so as to be spaced from each other by a designated interval and the other microphone may be disposed so as to be spaced upwards from the left microphone of the two microphones by a designated interval.

If the multi-channel microphone system 50 is provided, as exemplarily shown in FIG. 1, it is assumed that sound information collected by the multi-channel microphone system 50 is used to generate sound tracking results of a rear vehicle detection region of the sound tracking apparatus 100 on the assumption that detection of counterpart vehicles in front of the vehicle 10 (in the range of 180 to 360 degrees of a horizontal plane or a vertical plane) other than detection of counterpart vehicles at the rear of the vehicle 10 (in the range of 0 to 180 degrees of the horizontal plane or the vertical plane) is unnecessary.

The number and installed positions of the microphones of the multi-channel microphone system 50 on the vehicle 10 are not limited to the illustration shown in FIG. 1.

Figure 2:
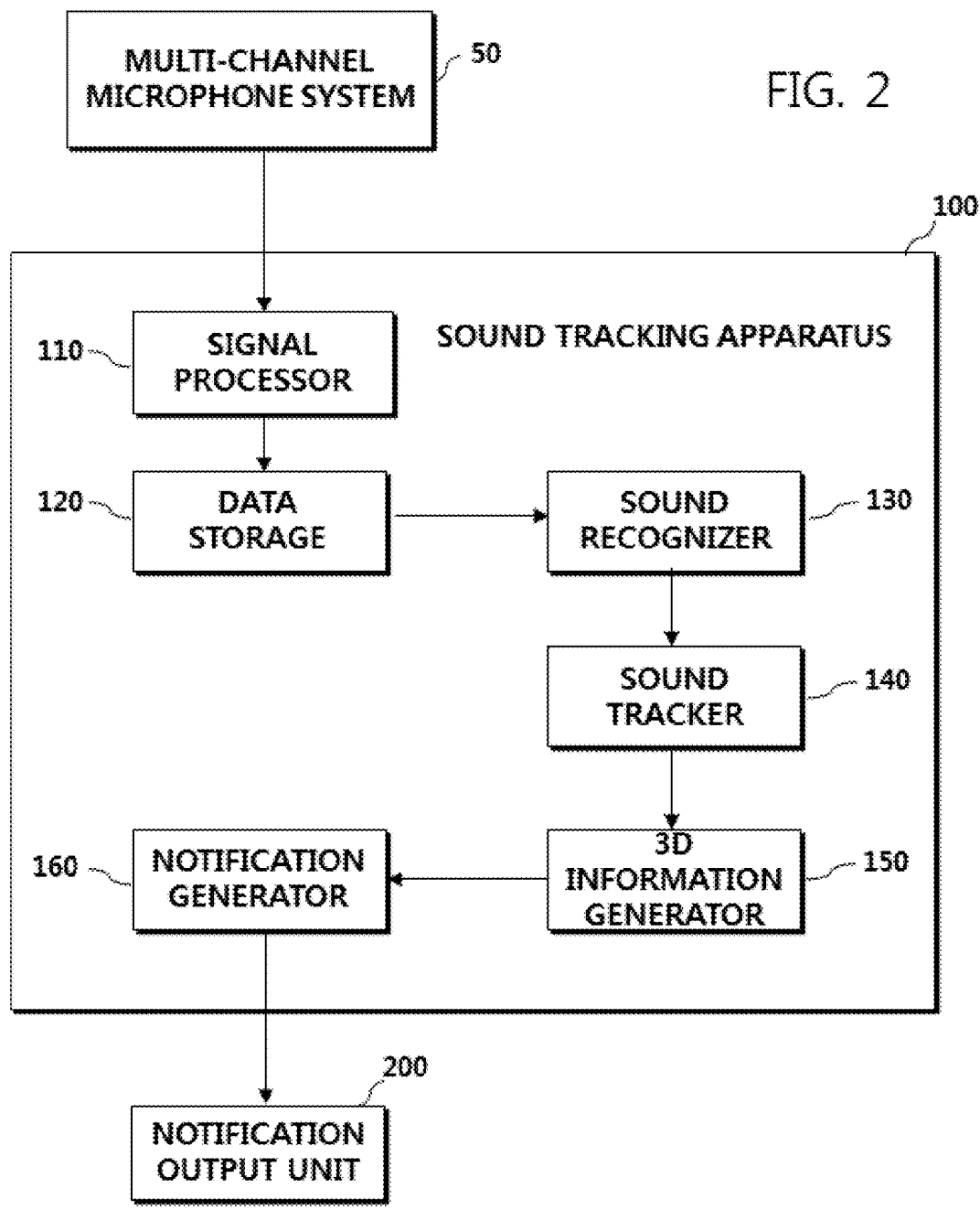
FIG. 2 is a block diagram illustrating a sound tracking apparatus shown in FIG. 1 in more detail.

With reference to FIG. 2, a detailed operation of the sound tracking apparatus 100 will be described below.

Figure 3:
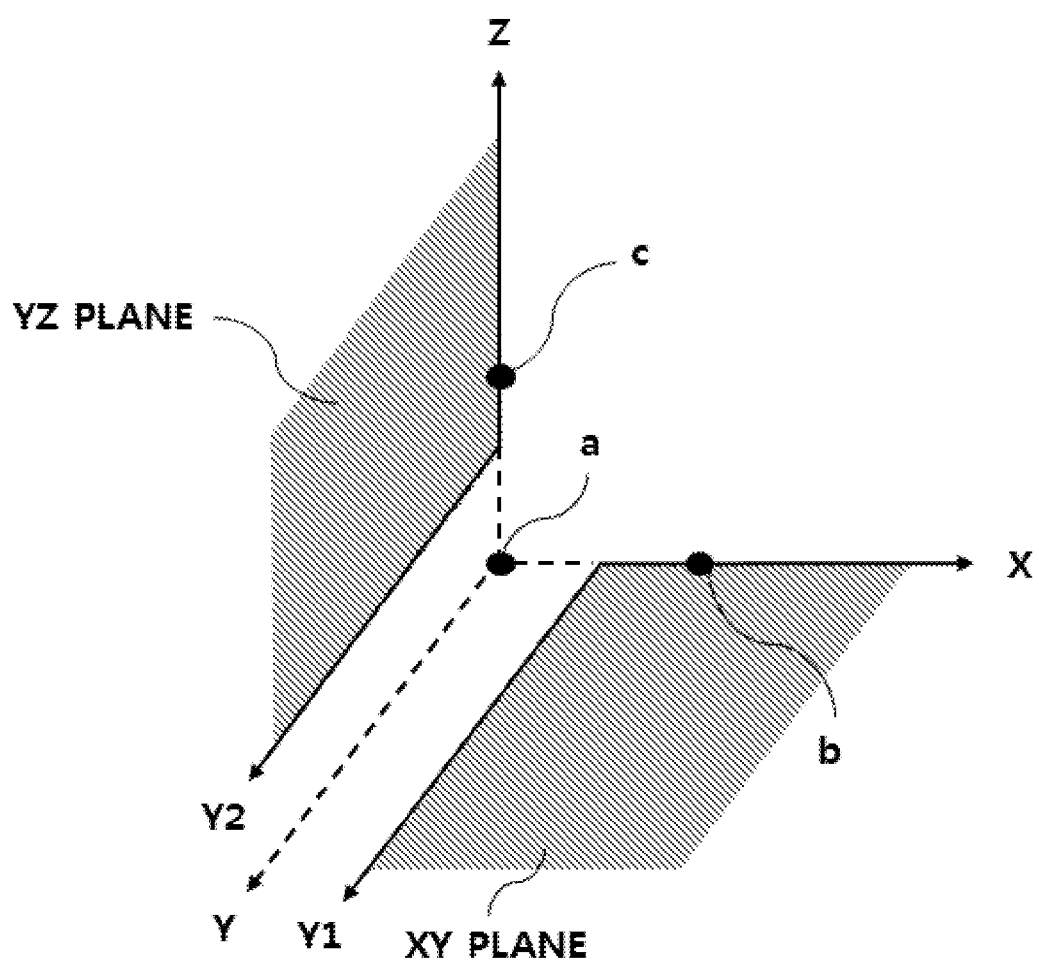
FIG. 3 is a view illustrating information included in sound tracking results.

FIG. 2 is a block diagram illustrating the sound tracking apparatus shown in FIG. 1 in more detail and FIG. 3 is a view illustrating information included in sound tracking results.

With reference to FIG. 2, the sound tracking apparatus 100 may include a signal processor 100, a data storage 120, a sound recognizer 130, a sound tracker 140, a 3D information generator 150, and a notification generator 160. The sound tracking apparatus 100 may be designed for vehicles and implement a part of a head unit of the vehicle 10, but the disclosure is not limited thereto.

The multi-channel microphone system 50 may sense sound generated around the vehicle 10, generate sound data through analog-to-digital conversion, and transmit the generated sound data to the signal processor 110.

Various sounds are present around a vehicle. That is, engine sound and tire frictional sound of other vehicles located around the vehicle, sounds generated from traffic lights and electronic boards, general natural sounds, etc. are present around the vehicle.

The driver wants to know states of vehicles driving in a rear lateral area or a rear area from the vehicle, which may not be observed from a front area or a side area, (for example, whether or not the vehicles desire to overtake the vehicle), and relative positions of these vehicles.

Some external sounds may not pass through a soundproof system of the vehicle and thus are not transmitted to the driver. When the driver hears a vehicle horn sound from the outside of the vehicle 10, the driver wants to know in which direction such a horn sound is generated and whether or not such a horn sound is directed at the vehicle 10. According to recognition of the horn sound, the driver may take various measures, i.e., decelerate the vehicle 10, change lanes, or operate an emergency light.

Further, if the driver excessively raises the volume of an audio system and thus may not hear a horn sound around the vehicle 10, it is necessary to inform the driver of generation of the horn sound around the driver vehicle 10 visually or through the audio system of the vehicle 10, for the purpose of driver safety.

The driver may be interested in other sounds. As one example, when the vehicle 10 is suddenly stopped, loud frictional sound is generated due to friction between a tire and the ground. Such frictional sound may be related to occurrence of a traffic accident or a situation just before a traffic accident and thus require driver's attention. As another example, when the vehicle collides with another vehicle, collision sound occurs. By recognizing collision sound generated from a front region or a side region and providing information on a direction in which such collision sound occurs, a subsequent accident may be prevented.

If a police car or ambulance siren is sounded around the driver, the driver should take a measure, for example, change lanes so that a corresponding vehicle may pass by the vehicle 10. In a specific case, the driver who took no measure may receive legal punishment. Therefore, it is necessary for the driver to recognize a siren of a vehicle belonging to a public institution.

The signal processor 110 may execute noise filtering of the acquired sound data. Various noise, characteristics or sources of which are difficult to detect, may be removed through such noise filtering. Further, sounds from a horn, a siren, tire frictional sound, collision sound, etc., in which the driver is interested, have a sufficiently high decibel (for example, 70 dB or more). Therefore, the signal processor 110 may judge whether or not the sound data, from which noise is removed, has a decibel of a reference value or more. That is, sound data having a decibel of less than the reference value may be removed by the signal processor 110.

The data storage 120 may store sound data, from which noise is removed. The data storage 120 may store the sound data as frames and provide the sound data frame-by-frame to the sound recognizer 130. Here, the frame may mean sound data collected at the same time and intervals between the frames may be a specific period (for example, 100 ms), but the disclosure is not limited thereto.

The sound recognizer 130 judges features of sound data. Even if sound data has a decibel of the predetermined reference value or more, such sound data may be of little importance to the driver. For example, sound generated when a train passes by or noise of an airplane around an airport has a considerably high decibel but may not greatly influence driving. Noise generated during road reconstruction or reorganization is the same. On the contrary, when the driver is continuously informed of such sound data, a driver's response speed to a situation which the driver needs to recognize may be lowered or the driver may not respond to such a situation.

The sound recognizer 130 extracts feature values in the time domain and the frequency domain from the sound data received from the data storage 120. The sound recognizer 130 may construct a database using average values and variance values of the feature values. Here, the feature values may be Mel-Frequency Cepstral Coefficients (MFCC), Total Spectrum Power, Sub-band Spectrum Power and/or peach frequency. The sound recognizer 130 may store average values and variance values of a frame of sound data for a designated time period, for example, 100 ms, in the database.

In voice signal processing, Mel-Frequency Cepstrum (MFC) is one method of expressing spectrum power of a short-term signal. This may be acquired by executing cosine transform of a log spectrum power in the frequency domain of a Mel scale. MFCC mean several Mel-Frequency Cepstral Coefficients coefficients. Generally, in MFCC, a pre-emphasis filter is applied to short-term data (signals) and Discrete Fourier Transform (DFT) is then applied thereto. Thereafter, spectrum power is acquired using Mel-scale filter banks (Mel filter banks) and logarithm of power of each Mel-scale is taken. When Discrete Cosine Transform (DCT) of acquired values is executed, MFCC values are acquired.

The total spectrum power means energy distribution of the overall spectrum in a designated frame section, and the sub-band power means an energy distribution value in each of 4 sub-band sections, such as [0, ⅛f0], [⅛f0, ¼f0], [¼f0, ½f0], [½f0, 0]. The peach frequency may be acquired by detecting the peak point of a normalized autocorrelation function.

The sound recognizer 130 may judge whether or not the driver is interested in the acquired sound data by classifying the feature values of the sound data through a classifier. The classifier may be any one of a Neural Network (NN) classifier, a Support Vector Machine (SVM) classifier and a Bayesian classifier.

Hereinafter, the NN classifier will be exemplarily described as the classifier.

The classifier of the sound recognizer 130 may classify sounds into a plurality of classes according to kinds of sounds, and calculate confidence levels based on similarity of the sound data to the classes using the feature values of the acquired sound data. That is, the confidence level may mean a probability that the sound data corresponds to sound of a specific class, and the sum total of the confidence levels of the sound data may be 1.

A sound classification result generated by the classifier of the sound recognizer 130 may include information on the respective classes, kinds of sounds corresponding to the respective classes, and confidence levels corresponding to the respective classes.

The sound recognizer 130 may generate a judgment result according to whether or not the confidence level is a reference value (for example, 0.7) or more and allow the judgment result to be included in the sound classification result. That is, if the confidence level is the reference value or more, the sound recognizer 130 may judge a kind of sound of the class corresponding to the confidence level as the kind of the current sound data.

Therefore, the sound recognizer 130 may analyze features of sound data and generate a sound classification result, i.e., information regarding which kind of sound the sound data belongs to.

The sound tracker 140 may track an occurrence direction of sound based on the sound data having a confidence level which is the reference value or more and thus belongs to a kind of sound (or a target sound source) of the corresponding class. The kind of sound may be provided by the sound recognizer 130.

The sound tracker 140 may accumulate sound data corresponding to continuous frames, identify sounds input to the respective microphones through temporal features (waveforms) of sounds, compare loudness of the same sound and calculate differences of arrival times of the sound at the respective microphones. The temporal features may be provided by the sound recognizer 130.

The loudness of sound is inversely proportional to the square of distance. Therefore, when a distance from an occurrence position of sound is doubled, the loudness of the sound is decreased to ¼ (about 6 dB). On the assumption that a vehicle generally has a width of about 2 m and a length of about 3 m, loudness differences of sensed sound may have a sufficiently meaningful value according to the position of an occurrence point of the sound.

For example, if the multi-channel microphone system 50 is implemented, as exemplarily shown in FIG. 1, when sound is generated from a region above the right portion of the vehicle 10, the loudness of sound sensed by the microphone located at the upper portion of the vehicle 10 is greater than the average loudness of sound sensed by the microphones located at the left and right sides of the lower portion of the vehicle 10. Further, the loudness of sound sensed by the microphone located at the right side of the lower portion of the vehicle 10 is greater than the loudness of sound sensed by the microphone located at the left side of the lower portion of the vehicle 10.

Using such features, an approximate direction of sound from the center of the vehicle 10 may be tracked using the loudnesses of sound collected by the respective microphones.

Further, using difference values (signal delays) of arrival times of sound at the respective microphones, an angle of an occurrence position of the sound may be calculated. Here, the sound tracker 140 stores in advance a table, in which signal delays corresponding to the respective microphones are mapped to an angle of the occurrence position of sound. For example, in such a table, t1 (signal delay of the first microphone), t2 (signal delay of the second microphone) and t3 (signal delay of the third microphone) are mapped to an angle of 1 degree, and a probability that an object to be tracked is present at the angle of 1 degree may be calculated by respectively applying the signal delays t1, t2 and t3 to sound data of the respective microphones stored in the data storage 120 and then summing acquired values.

Of course, if pairs of 2 microphones of the multi-channel microphone system 50, disposed in the vertical direction and the horizontal direction, are provided, as exemplarily shown in FIG. 1, signal delays corresponding to the respective microphones may be mapped to angles of the occurrence position of sound in the range of 0 to 180 degrees of a horizontal plane or the vertical plane, and a probability that an object to be tracked is present at an angle of 1 degree may be calculated by respectively applying signal delays t1 and t2 to sound data of the respective microphones stored in the data storage 120 and then summing acquired values.

That is, probabilities that an object to be tracked is present at respective angles may be calculated by applying delay values at all angles to a current signal. Thereby, the occurrence position of sound may be estimated. The reason for this is that there is a one-to-one relationship between an angle of the occurrence position of sound and signal delays corresponding to the respective microphones.

The sound tracker 140 may produce sound tracking results at respective angles in continuous frames according to time, using the above-described information.

The sound tracking results may be information on probabilities that an object corresponding to a target sound source is present at respective angles in each of the continuous frames according to time.

With reference to FIG. 3, if the multi-channel microphone system 50 includes a first microphone a, a second microphone b and a third microphone c, which are disposed as exemplarily shown in FIG. 3, a sound tracking result produced based on sound data collected by the first microphone a and the second microphone b may include probabilities that an object corresponding to a target sound source is present in the range of 0 to 180 degrees on an XY plane with the origin at the central point between the first microphone a and the second microphone b (on the assumption that the X-axis direction is 0 degrees and the angle is increased in the clockwise direction). Further, a sound tracking result produced based on sound data collected by the first microphone a and the third microphone c may include probabilities that the object corresponding to the target sound source is present in the range of 0 to 180 degrees on an YZ plane with the origin at the central point between the first microphone a and the third microphone c (on the assumption that the Z-axis direction is 0 degrees and the angle is increased in the counterclockwise direction).

That is, the sound tracking results may include a first sound tracking result and a second sound tracking result including information on independently produced probabilities that the object corresponding to the target sound source is present at respective angles in each of the continuous frames according to time, i.e., on the XY plane and the YZ plane.

Although FIG. 3 illustrate the Y-axis Y1 of the XY plane and the Y-axis Y2 of the YZ plane as being different due to the positions of the first microphone a, the second microphone b and the third microphone c, in order to express the target sound source as coordinates on one spatial coordinate system, the Y-axis Y1 and the Y-axis Y2 may be transferred in parallel to the Y-axis Y with the origin at the position of the first microphone a. A detailed description thereof will be described later with reference to FIGS. 4 to 7.

Referring again to FIG. 2, the 3D information generator 150 may generate 3D coordinates of a position, at which the target sound source is present, based on the first sound tracking result and the second sound tracking result. The 3D coordinates mean coordinates on a spatial coordinate system with the origin at the position of the first microphone a.

The notification generator 160 may generate information on the target sound source (the position, speed, angle, etc. of the target sound source) based on the 3D coordinates of the target sound source. Further, the notification generator 160 may generate a synthesized image by matching the 3D coordinates of the target sound source with an image captured by an external device (for example, a rear camera) of the sound tracking apparatus 100.

A notification output unit 200 provides information on the target sound source, based on information on the counterpart vehicle provided by the sound tracking apparatus 100, to the driver. The notification output unit 200 may provide the above information visually or audibly. Otherwise, the notification output unit 200 may provide the information through both methods.

The notification output unit 200 may be implemented as a head unit display (HUD) or a cluster mounted in the vehicle 10, and visually provides information on a sound occurrence region. Further, the notification output unit 200 may be implemented as a navigation system connected to the sound tracking apparatus 100 via wired communication, such as a CAN bus, or a smart device (a smart phone, a tablet PC, or a smart watch) connected to the sound tracking apparatus 100 via short range communication, such as Bluetooth, NFC, or Wi-Fi and provide information on a sound occurrence region to the driver.

Figure 4:
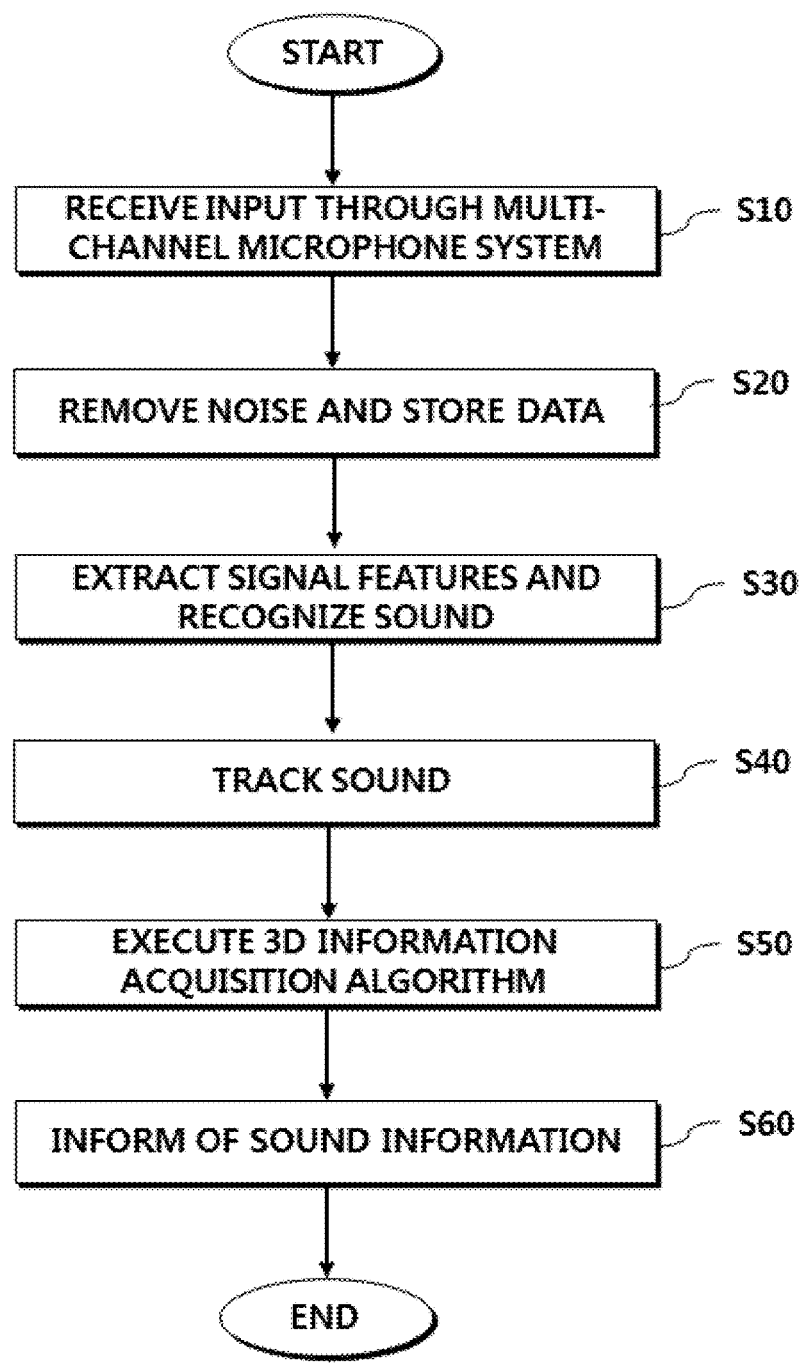
FIG. 4 is a flowchart illustrating a method of operating the sound tracking apparatus shown in FIG. 2.
Figure 5:
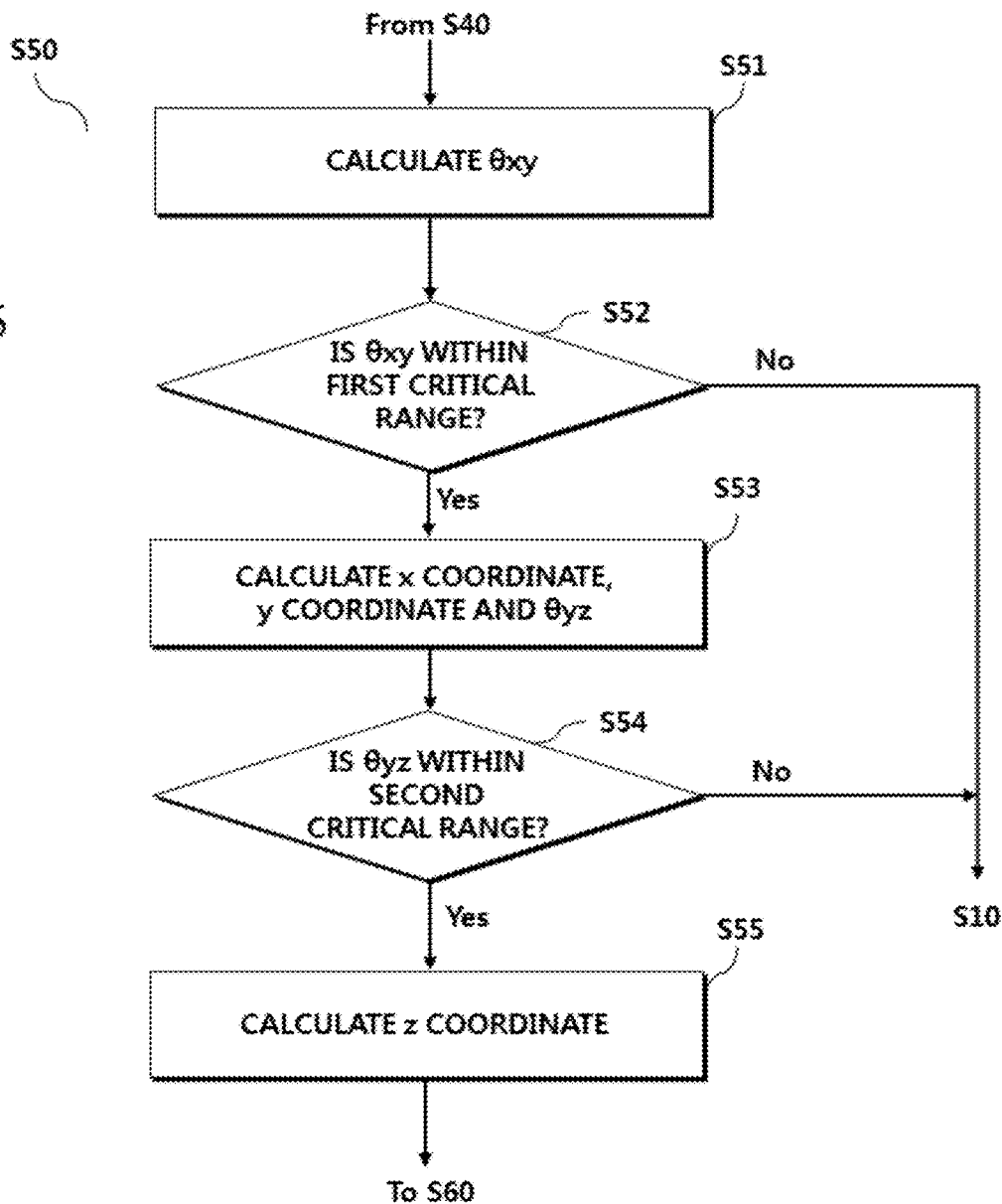
FIG. 5 is a flowchart illustrating Operation S50 shown in FIG. 4 in more detail.
Figure 6:
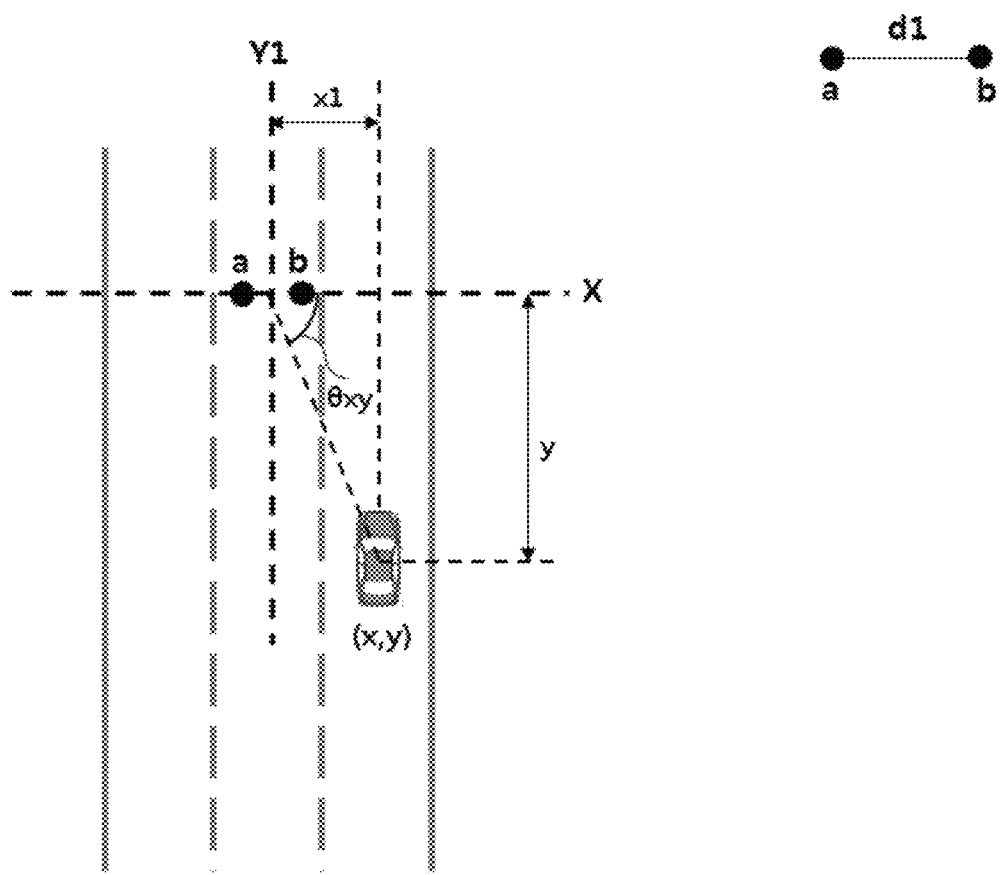
FIGS. 6 and 7 are views illustrating a method of calculating 3D coordinates by a 3D information generator shown in FIG. 2.
Figure 7:
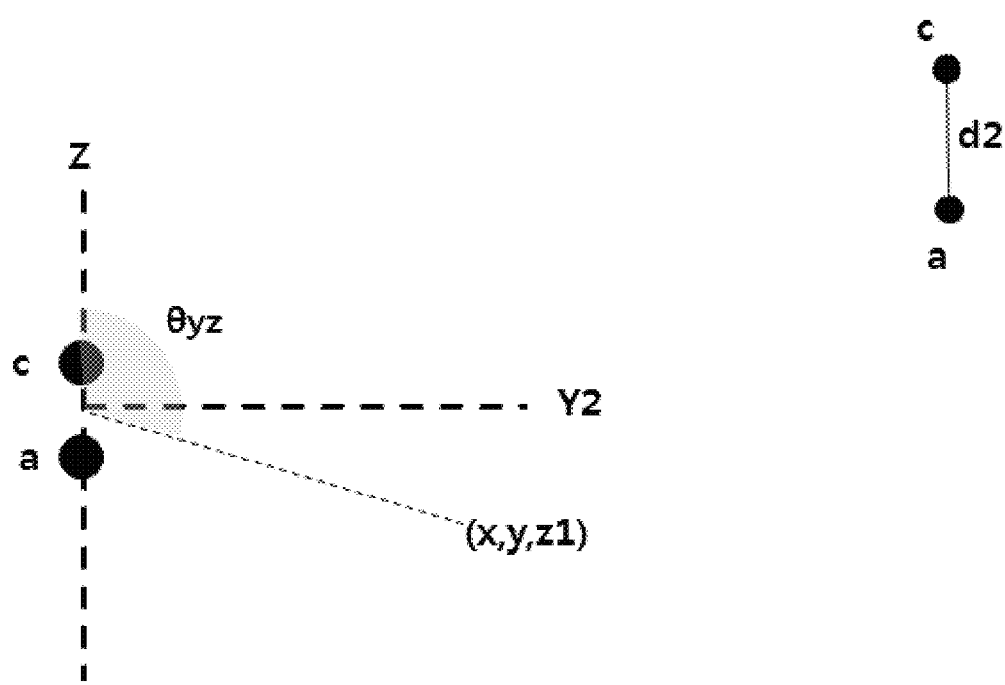
Figure 8:
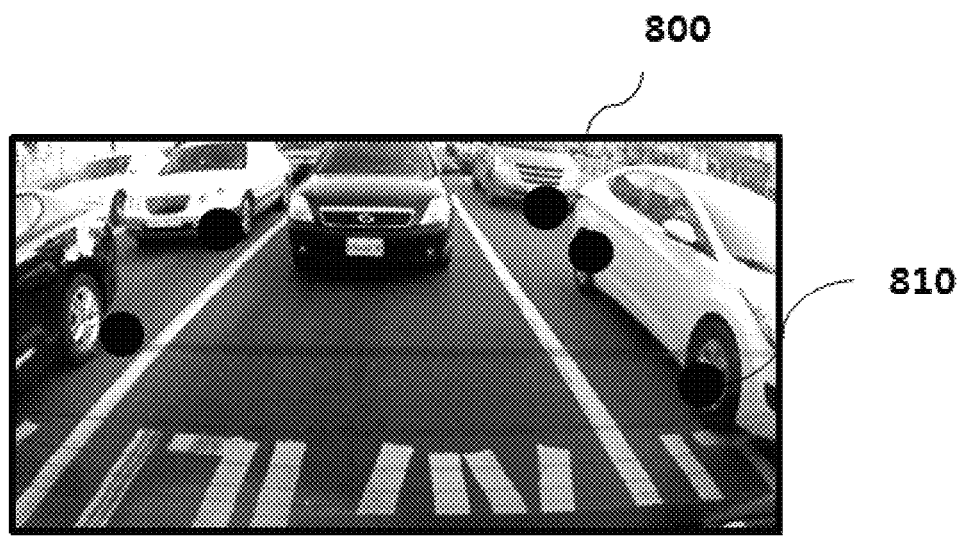
FIG. 8 is a view illustrating an image of a rear camera using 3D coordinates in accordance with one embodiment of the present invention.

FIG. 4 is a flowchart illustrating a method of operating the sound tracking apparatus shown in FIG. 2, FIG. 5 is a flowchart illustrating Operation S50 shown in FIG. 4 in more detail, FIGS. 6 and 7 are views illustrating a method of calculating 3D coordinates by the 3D information generator shown in FIG. 2, and FIG. 8 is a view illustrating an image of a rear camera using 3D coordinates in accordance with one embodiment of the present invention.

Hereinafter, with reference to FIGS. 2 to 8, a method of operating the sound tracking apparatus 100 of FIG. 2, i.e., a method of providing sound tracking information, will be described.

The signal processor 110 may sense sound generated around the vehicle 10 and acquire sound data generated through analog-to-digital conversion of the sound (Operation S10).

The signal processor 110 may execute noise filtering of the acquired sound data, and the data storage 120 may store sound data, from which noise is removed (Operation S20).

The sound recognizer 130 may extract feature values in the time domain and the frequency domain from the sound data received from the data storage 120, and generate a sound classification result by classifying the feature values through the classifier (Operation S30).

The sound tracker 140 may produce sound tracking results, i.e., information on probabilities that an object corresponding to the kind of sound of a class of a confidence level of a reference value or more is present at respective angles in each of continuous frames according to time based on the sound data, from the sound classification result (Operation S40).

The 3D information generator 150 may implement a 3D information acquisition algorithm which generates 3D coordinates of a position, at which a target sound source is located, based on the sound tracking results (Operation S50).

FIG. 5 illustrates Operation 50 in more detail.

The sound tracking results may include a first sound tracking result including probabilities that the object corresponding to the target sound source is present in the range of 0 to 180 degrees on the XY plane with the origin at the central point between the first microphone a and the second microphone b (on the assumption that the X-axis direction is 0 degrees and the angle is increased in the clockwise direction), and a second sound tracking result including probabilities that the object corresponding to the target sound source is present in the range of 0 to 180 degrees on an YZ plane with the origin at the central point between the first microphone a and the third microphone c (on the assumption that the Z-axis direction is 0 degrees and the angle is increased in the counterclockwise direction).

The 3D information generator 150 may calculate an angle θxy, at which the object corresponding to the target sound source is present on the XY plane, based on the first tracking result (Operation S51).

The first sound tracking result includes the probabilities that the object corresponding to the target sound source is present in the range of 0 to 180 degrees on the XY plane, and an angle section in which the probabilities are a critical probability (for example, 0.7) or more may be represented.

For example, if the angle section in which the probabilities are the critical probability (for example, 0.7) or more is a section of an angle of 100 to 120 degrees, and an angle having the highest probability (a peak angle) is 105 degrees, the 3D information generator 150 may set an angle of 110 degrees corresponding to the median angle of the angle section as the angle θxy, at which the object corresponding to the target sound source is present on the XY plane, or set an angle of 105 degrees having the highest probability as the angle θxy, at which the object corresponding to the target sound source is present on the XY plane. Such a calculation method is only exemplary and the disclosure is not limited thereto.

The 3D information generator 150 may judge whether or not the angle θxy, at which the object corresponding to the target sound source is present on the XY plane, is within a first critical range (Operation S52). The first critical range may mean an angle range which the target sound source may have, on the assumption that the target sound source is located in a lane adjacent to the lane of the driving vehicle 10. The first critical range may be experimentally arbitrarily set, for example, be an angle range of 30 to 70 degrees or 110 to 160 degrees, but the disclosure is not limited thereto.

According to embodiments, the first critical range may be set to an angle range acquired by excluding an excessively low angle range (of 0 to 20 degrees) and an excessively high angle range (of 70 to 90 degrees) from an angle range of 0 to 90 degrees. The reason for this is that it is unnecessary to notify the driver of a target sound source present in an excessively low angle range because a corresponding vehicle is overtaking the vehicle 10 or is exposed to a driver's field of view, and it is unnecessary to notify the driver of a target sound source present in an excessively high angle range because a corresponding vehicle is not located in an adjacent lane but is located in the same lane as the vehicle 10. In the same manner, the first critical range may be set to an angle range acquired by excluding an excessively low angle range (of 90 to 110 degrees) and an excessively high angle range (of 160 to 180 degrees) from an angle range of 90 to 180 degrees. The reason for this is that it is unnecessary to notify the driver of a target sound source present in an excessively high angle range because a corresponding vehicle is overtaking the vehicle 10 or is exposed to a driver's field of view, and it is unnecessary to notify the driver of a target sound source present in an excessively low angle range because a corresponding vehicle is not located in an adjacent lane but is located in the same lane as the vehicle 10.

If the angle θxy, at which the object corresponding to the target sound source is present on the XY plane, deviates from the first critical range (No in Operation S52), it is unnecessary to notify the driver of the corresponding target sound source and thus the 3D information generator 150 finishes implementation of the 3D information acquisition algorithm and the method returns to Operation S10.

If the angle θxy, at which the object corresponding to the target sound source is present on the XY plane, is within the first critical range (Yes in Operation S52), the 3D information generator 150 may calculate x and y coordinates of the object and an angle θyz, at which the object corresponding to the target sound source is present on the YZ plane (Operation S53).

With reference to FIG. 6, it is assumed that the vehicle 10 is driving in a median lane and a counterpart vehicle (i.e., the object corresponding to the target sound source) having coordinates (x,y) is driving behind the vehicle 10. An angle θxy, at which the counterpart vehicle is present on the XY plane, may be calculated based on a first sound tracking result generated at the moment of FIG. 6 and, on the assumption that the counterpart vehicle is located in a lane adjacent to the lane of the vehicle 10, a horizontal distance x1 between the vehicle 10 and the counterpart vehicle may correspond to a lane width.

The 3D information generator 150 may store a lane width table in advance and thus determine the horizontal distance x1 between the vehicle 10 and the counterpart vehicle based on the lane width table. The lane width table includes information on legal road widths according to road kinds (expressways/general roads (according to design speeds)) and area division (local areas/urban areas/roads for compact cars). The 3D information generator 150 may receive information on the kind of a road on which the vehicle 10 is currently driving and an area in which the vehicle 10 is currently driving from the navigation system connected to the sound tracking apparatus 100 via wired communication, such as a CAN bus, and determine a current lane width with reference to the lane width table according to the kind of the road and the area in which the vehicle 10 is currently driving. For example, in the lane width table, if the road is an expressway, legal road widths are defined as 3.5 m (in local areas), 3.5 m (in urban areas), and 3.5 m (in roads for compact cars), and, if the kind of the road received by the 3D information generator 150 from the navigation system corresponds to an expressway and the area received from the navigation system corresponds to an urban area, the 3D information generator 150 may determine 3.5 m as the horizontal distance x1 between the vehicle 10 and the counterpart vehicle.

Here, a vertical distance y between the vehicle 10 and the counterpart vehicle may be calculated by Equation 1 below.

$$y=\tan(\theta xy)*x1 \qquad \text{[Equation 1]}$$

That is, on the XY plane formed by the x-axis X and the y-axis Y1, the coordinates of the counterpart vehicle may be expressed as (x1,y). However, as described above with reference to FIG. 3, the coordinates of the counterpart vehicle may be transferred in parallel to the Y-axis Y with the origin at the position of the first microphone a, and Equation 2 below may be used.

$$x=x1+d1/2 \qquad \text{[Equation 2]}$$

Here, x denotes an x coordinate with the origin at the position of the first microphone a, and d1 denotes a distance between the first microphone a and the second microphone b.

The 3D information generator 150 may calculate an angle θyz, at which the object corresponding to the target sound source is present on the YZ plane, based on the second tracking result.

The second sound tracking result includes the probabilities that the object corresponding to the target sound source is present in the range of 0 to 180 degrees on the YZ plane, and an angle section in which the probabilities are a critical probability (for example, 0.7) or more may be represented. For example, if the angle section in which the probabilities are the critical probability (for example, 0.7) or more is a section of an angle of 100 to 120 degrees, and an angle having the highest probability (a peak angle) is 105 degrees, the 3D information generator 150 may set an angle of 110 degrees corresponding to the median angle of the angle section as the angle θyz, at which the object corresponding to the target sound source is present on the YZ plane, or set an angle of 105 degrees having the highest probability as the angle θyz, at which the object corresponding to the target sound source is present on the YZ plane. Such a calculation method is only exemplary and the disclosure is not limited thereto.

The 3D information generator 150 may judge whether or not the angle θyz, at which the object corresponding to the target sound source is present on the YZ plane, is within a second critical range (Operation S54). The second critical range may mean an angle range which the target sound source may have, on the assumption that the target sound source is located in a lane adjacent to the lane of the driving vehicle 10. The second critical range may be experimentally arbitrarily set, for example, be an angle range of 10 to 90 degrees, but the disclosure is not limited thereto.

According to embodiments, the second critical range may be set to an angle range acquired by excluding an excessively low angle range (of 0 to 10 degrees) from an angle range of 0 to 90 degrees. The reason for this is that it is unnecessary to notify the driver of a target sound source present in an excessively low angle range because a corresponding vehicle is overtaking the vehicle 10 or is exposed to a driver's field of view or the target sound source corresponds to tire frictional sound of the vehicle 10. Further, the second critical range may be set to an angle range excluding an angle range of 90 to 180 degrees. The reason for this is that it is unnecessary to notify the driver of a target sound source present in the angle range of to 180 degrees because the target sound source does not correspond to noise of a counterpart vehicle but corresponds to noise of an airplane, etc.

If the angle θyz, at which the object corresponding to the target sound source is present in the YX plane, deviates from the second critical range (No in Operation S54), it is unnecessary to notify the driver of the corresponding target sound source and thus the 3D information generator 150 finishes implementation of the 3D information acquisition algorithm and the method returns to Operation S10.

If the angle θyz, at which the object corresponding to the target sound source is present on the YZ plane, is within the second critical range (Yes in Operation S54), the 3D information generator 150 may calculate a y coordinate of the object (Operation S55).

With reference to FIG. 7, a height z1 between the vehicle 10 (more particularly, the central point between the first microphone a and the third microphone c) and the counterpart vehicle (more particularly, a point of a tire of the counterpart vehicle contacting the road surface) may be calculated by Equation 3 below.

$$z1=y/\tan(\theta yz) \qquad \text{[Equation 3]}$$

That is, on the YZ plane formed by the z-axis Z and the y-axis Y2, the coordinates of the counterpart vehicle may be expressed as (y,z1). However, as described above with reference to FIG. 3, the coordinates of the counterpart vehicle may be transferred in parallel to the Y-axis Y with the origin at the position of the first microphone a, and Equation 4 below may be used.

$$z=z1-d2/2 \qquad \text{[Equation 4]}$$

Here, z denotes a z coordinate with the origin at the position of the first microphone a, and d2 denotes a distance between the first microphone a and the third microphone c.

Therefore, the 3D information generator 150 calculates 3D coordinates of the object corresponding to the target sound source, which is located on a spatial coordinate system with the origin at the position of the first microphone a, through the 3D information acquisition algorithm.

The notification generator 160 may generate information on the target sound source (the position, speed, angle, etc. of the target sound source) based on the 3D coordinates of the target sound source. Further, the notification generator 160 may generate a synthesized image by matching the 3D coordinates of the target sound source with an image captured by an external device (for example, a rear camera) of the sound tracking apparatus 100.

With reference to FIG. 8, the notification generator 160 may acquire an image from the rear camera, and generate a synthesized image 800 by matching at least one position icon 810 of target sound sources with the acquired image in consideration of the position, capturing direction and field of view (FOV) of the rear camera, a 3D position difference of the rear camera with the first microphone a, etc.

The image 800 of FIG. 8 is only one example of 3D coordinates of target sound sources, and the driver may be notified of 3D coordinates through other methods or 3D coordinates may be used to control the vehicle 10 through other methods.

As exemplarily shown in FIG. 8, a plurality of target sound sources may be present in one frame of sound tracking results, and the sound tracking apparatus 100 may execute respective operations of FIG. 4 with respect to the target sound sources, independently.

The notification output unit 200 provides information on the target sound source, based on information on the counterpart vehicle provided by the sound tracking apparatus 100, to the driver. Particularly, the notification output unit 200 may output the image 800 and thus provide a synthesized image through which the driver may more intuitively detect the position of the target sound source in the image captured by the rear camera (Operation S60).

As is apparent from the above description, the sound tracking apparatus 100 for vehicles in accordance with one embodiment of the present invention may calculate 3D coordinates of a target sound source based on sound acquired from the outside of a vehicle, thus detecting the 3D position of the target sound source around the vehicle.

Further, the sound tracking apparatus 100 for vehicles may display a synthesized image by matching the 3D coordinates of the target sound source with an image acquired from the rear camera, thus allowing a driver to more intuitively detect the position of the target sound source in the image captured by the rear camera.

Moreover, the sound tracking apparatus 100 for vehicles may not execute calculation of 3D coordinates of a target sound source, notification of which is unnecessary, and notification of such target sound source through a 3D information acquisition algorithm.

The above-described method of providing sound tracking information may be implemented as computer readable code stored in a computer readable recording medium. Computer readable recording media includes all kinds of computer readable recording devices in which data readable by computers is stored. For example, the computer readable recording media includes a Read Only Memory (ROM), a Random Access Memory (RAM), a magnetic tape, a magnetic disk, a flash memory, an optical data storage device, etc. Further, the computer readable recording media may be stored and implemented as code which is distributed in a computer system and readable in a distributed manner.

It will be apparent to those skilled in the art that various modifications and variations can be made.

What is claimed is:

1. A method of providing sound tracking information, comprising:

generating sound tracking results based on sound data generated by sensing sound generated around a vehicle;

calculating 3D coordinates of a target sound source according to angle values of the target sound source recognized from the sound tracking results; and generating a notification of the target sound source based on the 3D coordinates, wherein the sound tracking results include information on probabilities that an object corresponding to the target sound source is present at respective angles in each of continuous frames according to time, and wherein the sound tracking results include a first sound tracking result including probabilities that the object corresponding to the target sound source is present on an XY plane with the origin at the central point between a first microphone and a second microphone, and a second sound tracking result including probabilities that the object corresponding to the target sound source is present on an YZ plane with the origin at the central point between the first microphone and a third microphone.

2. The method according to claim 1, wherein calculation of the 3D coordinates of the target sound source includes:

calculating an angle, at which the object corresponding to the target sound source is present on the XY plane, based on the first sound tracking result; and judging whether or not the angle, at which the object corresponding to the target sound source is present on the XY plane, is within a first critical range, wherein the first critical range is an angle range which the target sound source may have, if the target sound source is located in a lane adjacent to the lane of the driving vehicle.

3. The method according to claim 2, wherein calculation of the 3D coordinates of the target sound source further includes:

if the angle, at which the object corresponding to the target sound source is present on the XY plane, is within the first critical range, calculating an angle, at which the object corresponding to the target sound source is present on the YZ plane, based on the second sound tracking result; and judging whether or not the angle, at which the object corresponding to the target sound source is present on the YZ plane, is within a second critical range, wherein the second critical range is an angle range which the target sound source may have, if the target sound source is located in a lane adjacent to the lane of the driving vehicle.

4. The method according to claim 3, wherein if the angle, at which the object corresponding to the target sound source is present on the XY plane, deviates from the first critical range or the angle, at which the object corresponding to the target sound source is present on the YZ plane, deviates from the second critical range, generation of the sound tracking results is carried out without calculation of the 3D coordinates of the target sound source.

5. The method according to claim 1, wherein calculation of the 3D coordinates of the target sound source includes:

determining a horizontal distance between the vehicle and the target sound source based on a lane width table including information on legal road widths according to road kinds and areas; and calculating an X coordinate of the target sound source by transferring the horizontal distance between the vehicle and the target sound source in parallel to the Y-axis with the origin at the position of the first microphone.

6. The method according to claim 5, wherein calculation of the 3D coordinates of the target sound source further includes calculating a Y coordinate of the target sound source based on an angle, at which the object corresponding to the target sound source is present on the XY plane, and the horizontal distance between the vehicle and the target sound source.

7. The method according to claim 6, wherein calculation of the 3D coordinates of the target sound source further includes:
calculating a height between the vehicle and the target sound source based on the angle, at which the object corresponding to the target sound source is present on the YZ plane, and the Y coordinate of the target sound source; and
calculating a Z coordinate of the target sound source by transferring the height between the vehicle and the target sound source in parallel to the Y-axis with the origin at the position of the first microphone.

8. The method according to claim 1, wherein generation of the notification of the target sound source includes generating a synthesized image by matching the position of the target sound source with an image acquired from a rear camera based on the 3D coordinates.

9. A sound tracking apparatus for vehicles comprising:
a sound tracker configured to generate sound tracking results based on sound data generated by sensing sound generated around a vehicle;
a 3D information generator configured to calculate 3D coordinates of a target sound source according to angle values of the target sound source recognized from the sound tracking results; and
a notification generator configures to generate a notification of the target sound source based on the 3D coordinates,
wherein the sound tracking results include information on probabilities that an object corresponding to the target sound source is present at respective angles in each of continuous frames according to time, and
wherein the sound tracking results include a first sound tracking result including probabilities that the object corresponding to the target sound source is present on an XY plane with the origin at the central point between a first microphone and a second microphone, and a second sound tracking result including probabilities that the object corresponding to the target sound source is present on an YZ plane with the origin at the central point between the first microphone and a third microphone.

10. The sound tracking apparatus for vehicle according to claim 9, wherein the 3D information generator:
calculates an angle, at which the target sound source is present on the XY plane, based on the first sound tracking result; and
judges whether or not the angle, at which the target sound source is present on the XY plane, is within a first critical range,
wherein the first critical range is an angle range which the target sound source may have, if the target sound source is located in a lane adjacent to the lane of the driving vehicle.

11. The sound tracking apparatus for vehicles according to claim 10, wherein the 3D information generator:
if the angle, at which the object corresponding to the target sound source is present on the XY plane, is within the first critical range, calculates an angle, at which the object corresponding to the target sound source is present on the YZ plane, based on the second sound tracking result; and
judges whether or not the angle, at which the object corresponding to the target sound source is present on the YZ plane, is within a second critical range,
wherein the second critical range is an angle range which the target sound source may have, if the target sound source is located in a lane adjacent to the lane of the driving vehicle.

12. The sound tracking apparatus for vehicles according to claim 11, wherein the 3D information generator, if the angle, at which the object corresponding to the target sound source is present on the XY plane, deviates from the first critical range or the angle, at which the object corresponding to the target sound source is present on the YZ plane, deviates from the second critical range, again generates the sound tracking results without calculation of the 3D coordinates of the target sound source.

13. The sound tracking apparatus for vehicles according to claim 9, wherein the 3D information generator:
determines a horizontal distance between the vehicle and the target sound source based on a lane width table including information on legal road widths according to road kinds and areas; and
calculates an X coordinate of the target sound source by transferring the horizontal distance between the vehicle and the target sound source in parallel to the Y-axis with the origin at the position of the first microphone.

14. The sound tracking apparatus for vehicles according to claim 13, wherein the 3D information generator calculates a Y coordinate of the target sound source based on the angle, at which the object corresponding to the target sound source is present on the XY plane, and the horizontal distance between the vehicle and the target sound source.

15. The sound tracking apparatus for vehicles according to claim 14, wherein the 3D information generator:
calculates a height between the vehicle and the target sound source based on the angle, at which the object corresponding to the target sound source is present on the YZ plane, and the Y coordinate of the target sound source; and
calculates a Z coordinate of the target sound source by transferring the height between the vehicle and the target sound source in parallel to the Y-axis with the origin at the position of the first microphone.

16. The sound tracking apparatus for vehicles according to claim 9, wherein the notification generator generates a synthesized image by matching the position of the target sound source with an image acquired from a rear camera based on the 3D coordinates.

17. A vehicle comprising:
first to third microphones configured to generate sound data by sensing sound generated around the vehicle;
a sound tracking apparatus configured to calculate 3D coordinates of a target sound source according to angle values of the target sound source recognized from sound tracking results generated based on the sound data, and to generate a notification of the target sound source based on the 3D coordinates; and
a notification output unit configured to inform a driver of information on the target sound source,
wherein the sound tracking results include information on probabilities that an object corresponding to the target sound source is present at respective angles in each of continuous frames according to time, and wherein the sound tracking results include a first sound tracking result including probabilities that the object corresponding to the target sound source is present on an XY plane with the origin at the central point between a first microphone and a second microphone, and a second sound tracking result including probabilities that the object corresponding to the target sound source is present on an YZ plane with the origin at the central point between the first microphone and a third microphone.

* * * * *